Dec. 29, 1942.　　　　H. E. SOMES　　　　2,306,763
VOLTAGE CONTROL SYSTEM
Filed July 1, 1938
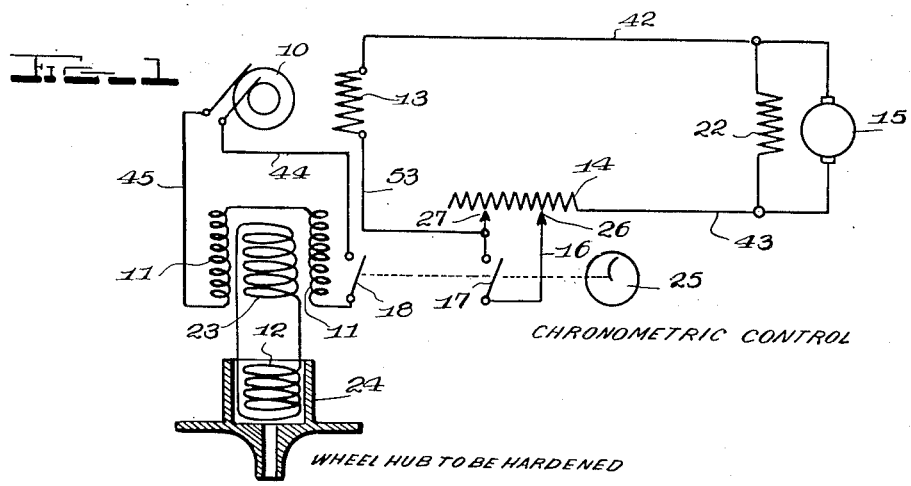
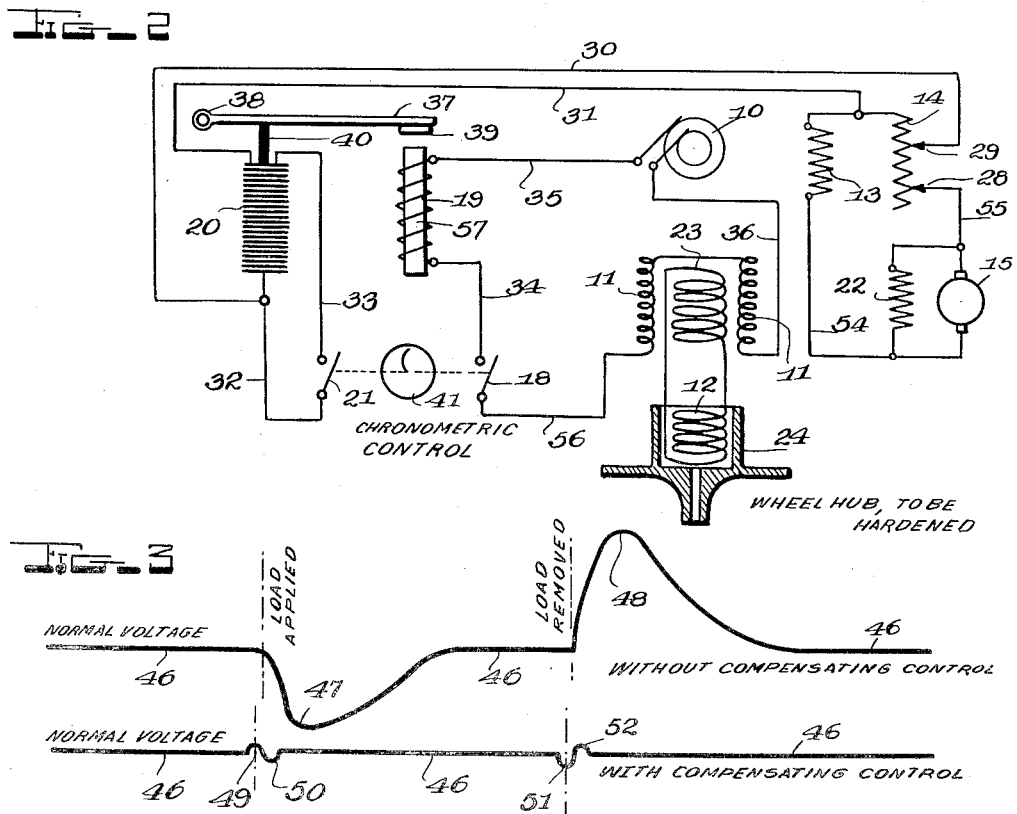
INVENTOR.
Howard E. Somes
BY
ATTORNEY.

Patented Dec. 29, 1942

2,306,763

UNITED STATES PATENT OFFICE 2,306,763

VOLTAGE CONTROL SYSTEM

Howard E. Somes, Grosse Pointe Park, Mich., assignor to Budd Induction Heating, Inc., Philadelphia, Pa., a corporation of Michigan Application July 1, 1938, Serial No. 216,932

7 Claims. (Cl. 171—229)

The present invention relates to means for stabilizing the voltage in electric supply systems.

More specifically, it relates to means for keeping the voltage of a high frequency alternator practically constant despite sudden variations in power output of the alternator.

Still more specifically, it relates to control means for use in high frequency alternating current induction heating systems, such as are used for heating articles to be hardened or for spot welding and other applications, wherein the load is suddenly applied to and suddenly removed from the source of power.

Heretofore when a sudden demand for power was made on a generator used, for example, in induction heating or in spot welding, the voltage of the alternator supplying the power dropped suddenly in spite of the provision of a compensating means in the exciter supplying the field excitation of the alternator, because such compensating means, for example a compound winding or the like, actually requires a certain amount of time before it can function properly, because of the inductive lag in response.

The present invention takes the place of such formerly known means or supplements them, as the case may be, and consists in means for suddenly initiating an increase in field excitation of the alternator just before the load is applied to the alternator, thus giving the field of the alternator time to build up its strength to take care of the added demand for power.

To prevent a sudden rise of voltage due to overcompensation, when the load is suddenly removed, the invention provides means for increasing the resistance in the field circuit of the alternator shortly before the load is removed from the alternator, so that by the time that the load actually is taken off, the voltage of the alternator will have dropped practically to its normal no-load value, thus preventing unnecessary surges of power in the circuits.

These objects are accomplished in the present instance in two distinct ways, the first being the actual changing of the resistance in the circuit by short circuiting or again open circuiting a portion of a control resistance, such as a field rheostat of the alternator of conventional type, and the other being the similar short circuiting of a carbon pile resistance which is connected in the field circuit of the alternator and which itself has an automatic control intended to respond to the output current of the alternator.

While these two embodiments are specifically disclosed in the present case it is obvious that other means may also be used for the purpose and the invention is not to be considered as limited to such specific expedients.

The opening and closing of the circuits is accomplished by a chronometric control that is by switches which will close and open the circuits at pre-set times, such as one of the so-called "program clocks" already known in the art, which is here made to operate the switches in definite sequence and at definite times. The chronometric switch per se does not form a part of the present invention and is disclosed only conventionally for this reason.

The attached drawing shows two embodiments of the invention, and in said drawing:

Figure 1 shows a circuit for controlling the field rheostat of the alternator to provide the desired compensation, Figure 2 shows a circuit wherein a carbon pile is used in the field circuit of the alternator and wherein this carbon pile is controlled by an automatic current-responsive electromagnet, Figure 3 shows the curve of voltage which would be obtained without using the present compensating control, and Figure 4 shows a curve to a similar scale but with the compensating control in action.

Referring first to Figure 1 the alternator 10 here shown as a single phase machine, although the number of phases is, of course, immaterial, has a field winding 13, which is supplied with the necessary exciting current from the exciter 15, having the field winding 22, and which feeds the exciting current to the field 13 through the conductors 42, 43 and 53, with the field rheostat 14 of the alternator 10 interposed in series therewith, as shown. The alternator 10 through its output leads 44 and 45 supplies power to the primary winding 11, 11, here shown as having two sections, whenever the circuit is closed through the switch 18. The transformer whose primary winding is 11, 11 has a secondary winding 23 which is permanently connected to the heating coil 12, here shown in position to heat the interior of the bore of a wheel hub 24 which is to be hardened.

The field rheostat 14 has two sliding contacts 26 and 27 cooperating therewith, 27 corresponding to the normal contact of the rheostat, which may be adjusted to control the voltage of the alternator to its correct value under no-load conditions. The other slider 26 is adjusted to such position on the rheostat 14 that when the switch 17 is closed so as to connect slider 26 to slider 27, through the conductor 16, in other words, so as to short circuit that portion of the resistance 14 between sliders 26 and 27, the field excitation of the alternator will be increased to the proper value to maintain correct output voltage of the alternator 10 under full load conditions.

The dotted line connecting the switches 17 and 18 and leading to the chronometric control 25 indicates a mechanical connection of any desired type whereby the control 25 will close the switches 17 and 18 in proper sequence and this may, of course, be built into the chronometric control device itself, that is, the switches 17 and 18 may be actually built into the chronometric control itself, this being a well known expedient in program clocks and the like.

The alternator 10 is of any desired kind, but preferably for the present purpose it is a high frequency alternator delivering current of a frequency in the high audio frequency ranges. For instance, the inventor has found a frequency of 2500 cycles per second well adapted to the purpose for which he intends to use the alternator, namely, for high frequency induction heating, spot welding, or the like.

The apparatus and process of heating are disclosed in prior case Serial No. 96,346, filed August 17, 1936.

Referring now to the modified form shown in Figure 2, the alternator 10 again has a field winding 13 which is energized by the exciter 15, with its own field winding 22, a rheostat 14 being interposed in the field circuit of the alternator and controlled in the usual way by the slider 28, conductors 54 and 55 serving to supply current from the exciter to the alternator field 13.

A carbon pile rheostat 20 is connected through conductor 31 to one end of the field winding 13 and through conductor 30 to an additional slider 29 on the resistance 14, so that the carbon pile is in parallel with a portion of such resistance 14. The carbon pile in its normal or uncompressed condition will, of course, have its maximum resistance and its minimum controlling effect on the resistance 14. The sliders 28 and 29 are adjusted on the resistance 14 so as to produce the normal voltage of the alternator 10 under no-load conditions. The alternator 10 through the conductor 36 is connected to the primary winding 11, 11 of the transformer, then through conductor 56 to the switch 18, thence through conductor 34 and through the heavy wire winding 19 of the electromagnet 57 and then back to the alternator through the conductor 35. The transformer has the secondary winding 23 cooperating with the winding 11, 11 and connected permanently to the induction heating coil 12, shown within the bore of the hub 24, which is to be heated for hardening.

The carbon pile 20 has an automatic pressure applying device which comprises a lever 37 pivoted at 38 and bearing upon one end of the carbon pile, through a block of insulating material 40. The other end of the lever 37 carries an armature 39 which cooperates with the electromagnet 57 so that when increased current flows through the winding 19 of said electromagnet there will be an increased pull on the armature 39, thus causing the pressure on the pile 20 to increase also, thereby diminishing the resistance of the pile. Since the pile is in parallel with a portion of the rheostat 14, the resistance, in series with the field 13 of the alternator, will be decreased when the resistance of the carbon pile 20 decreases. These parts are normally so adjusted that when the alternator is carrying its full load current its voltage will be the correct full load voltage, by reason of the compensation provided by the electromagnet 57 which compresses the carbon pile. However the action secured by the electromagnet and the carbon pile is not sufficiently rapid to compensate for the sudden fluctuation of load which takes place when the switch 18 is closed, in other words when the full load is applied suddenly to the alternator 10. To compensate for this condition the chronometric control 41 is provided and so arranged that it will close the switch 21, which is connected to the opposite terminals of the carbon pile 20, through the conductors 32 and 33, so that said carbon pile will be short circuited when the switch 21 is closed. This permits the field of the alternator to build up very rapidly and would over-control the said field if left closed permanently. That is, short circuiting the carbon pile 20 will produce too high a voltage in the output circuit of the alternator even under full load conditions.

To prevent this undesirable effect the switch 21 is left closed only for a sufficient time for the full load output current of the alternator 10 to become established and thereupon said output current through the electromagnet 57 will automatically compress the carbon pile 20 to the proper extent to maintain such normal output current and, therefore, the chronometric control after closing the switch 21 for a brief interval, sufficient merely to allow the output current to become established, will again reopen the switch 21. The chronometer control also closes the switch 18 and keeps it closed for the time necessary to accomplish the desired induction heating operation of the heating coil 12. It is obvious that the switch 21 must be closed a moment before closing the switch 18 and again opened a moment after the switch 18 has been closed.

Figure 3 shows the voltage or current curve which would be obtained with the alternator without having the compensating control forming the subject matter of the present invention and it will be noted that the normal voltage (or current), indicated by the horizontal line 46, will drop to a minimum at 47 shortly after the load is applied and will gradually recover its normal value and then after the load is removed it will rise to a maximum indicated at 48 and will thereafter again recover its normal value, as shown by the horizontal line 46.

With the compensating control provided by the present invention there will be a slight rise, as shown at 49, shortly before the load is applied, followed perhaps by a slight drop to the point 50 immediately after the load is applied. The normal voltage 46 will, however, soon be restored and during practically all the time that the load is on, such voltage 46 will continue to exist.

Upon opening the switch 17 shortly before the load is removed, which means, of course, that the chronometric device 25 opens the switch 17 a moment before it opens the switch 18, there will be a slight drop 51 in the output voltage followed by a slight rise immediately after the load is removed whereupon the normal no-load voltage 46 is restored almost at once.

The operation of the present system is clear from the above description of the circuits it employs and it is, therefore, believed to be unnecessary to repeat the same.

The chief characteristic of the present system, in either embodiment, is that a rising voltage characteristic is established in the alternator just before the expected load comes on and that this voltage is reduced below normal just before the load is removed thereby avoiding any such unnecessary and wasteful surges of power as are indicated diagrammatically in Figure 3 and also assuring a bigger power output during the actual time that such output is being utilized by the heating coil. Reference to Figure 3, for example will show that during much of the short interval in which the coil 12 is energized it will be supplied with far too little power, for when both voltage and current drop, as indicated at 47, the power will, of course, drop in proportion to the square of the drops in voltage or current, since power is the product of current and voltage.

Thus it will be seen that the advantage of curve 4 over curve 3 is even much greater than would appear from the peaks in the current and/or voltage alone, shown by the actual curves.

The chronometric control indicated at 25, as well as that indicated at 41 is of conventional construction and comprises merely a means which will close and open electric circuits with any desired timing and sequence. Such chronometric control is already in use in controlling the time of applying power to the heating coil 12 and is disclosed in my above mentioned copending case.

The prior application referred to herein indicates the time during which the load is on is only about 1 1/10 seconds, more or less. This fact together with the showing in Figs. 3 and 4 of the drawing indicate that any change in generator voltage due either to generator excitation or to switching the load, is not instantaneous but requires a small time, a small fraction of a second. The tendency to a change in generator voltage due to a change in generator excitation is not complete before the tendency to generator voltage change from switching the load becomes effective, because if it were, the change in voltage due to switching the load in Figs. 3 and 4 should be of the same magnitude, but they are not. The tendency to generator voltage change from a load-switching operation should be to a substantial extent contemporaneous with the tendency for change in generator voltage due to the change in generator excitation. Both tendencies probably are growing at the same time in opposition to one another. The time for beginning the change in generator excitation is but a small fraction of a second prior to the switching operation, the voltage effect of which it is to oppose. The drawing suggests the change in generator excitation need be no larger than enough to produce the tendency to generator voltage change which is desired for opposition to the tendency to generator voltage change due to the switching of the load on or off the generator.

It will also be clear that although I have described two specific circuits making use of my invention, the invention itself is of far broader application than these specific circuits would indicate and, therefore, these circuits are to be considered merely in an illustrative and not in a limitative sense in any way.

I claim:

1. The method of improving the voltage regulation of a generator at the time of switching a load on or off the generator when the load is of a character to cause substantial change in generator voltage due to such switching, which comprises the steps of counteracting such tendency to change in generator voltage during much of the time such tendency to generator voltage change due to load switching is growing, by changing the generator excitation in a manner to produce a tendency to generator voltage change that opposes the tendency to generator voltage change due to the load switching and in an amount to substantially oppose the load switching tendency to generator voltage change, and switching the load substantially simultaneously with and at such time with respect to the change in generator excitation that these opposing tendencies are near enough equal and opposite so that the change in generator voltage due to said opposing tendencies is but a small part of what the change in generator voltage would be when due to the load switching without said change in generator excitation.

2. The method of improving the voltage regulation of a generator at the time of switching a load on or off the generator when the load is of a character to cause substantial change in generator voltage due to such switching, which comprises changing the generator excitation in a direction to oppose the tendency of the load switching operation to disturb the generator voltage when the change in generator excitation is applied before such load switching by such time that the change in generator voltage due to change in generator excitation is yet slight and when the magnitude of the change in generator excitation is sufficient to substantially oppose the tendency to generator voltage change due to the load switching, and then switching the load at nearly the same time as said change in generator excitation whereby the change in generator voltage due to both load switching and change in generator excitation is only a minor part of what it would be if due to load switching without said change in generator excitation having been present.

3. The method of improving the voltage regulation of a generator at the time of throwing the load on the generator when the load is of a character to cause substantial drop in generator voltage on its connection to the generator, which comprises increasing the excitation of the generator by not substantially more than an amount sufficient to oppose said drop in generator voltage due to throwing on the load, said increase in generator excitation being initiated before the load is switched on by such a short time that there is only a slight increase in generator voltage due to increase in generator excitation, and then switching on the load at substantially the same time but slightly after the increase in generator excitation is begun whereby the drop in generator voltage is greatly reduced compared to what it would be without the opposition due to the increase in generator excitation.

4. The method of obtaining better voltage regulation of a generator at the time of disconnecting a load when said load is of a character to cause substantial rise in generator voltage, which comprises reducing the generator excitation just before the load is removed by such time that there is only a slight drop in generator voltage before the load is removed and said reduction in generator excitation being in an amount such as to substantially oppose the increase in generator voltage due to said load removal, and then removing said load at substantially the same time but slightly after the decrease in generator excitation is started whereby the change in generator voltage due to disconnecting the load is substantially counteracted by the change in generator voltage due to reduction in excitation.

5. An apparatus for improving voltage regulation which includes a generator, a load of a character to cause substantial change in generator voltage when connected to or disconnected from the generator, means for changing the generator excitation in a direction to effect a tendency to a change in generator voltage that opposes the tendency to generator voltage change due to connecting or disconnecting said load and of an amount such that the change in generator voltage due to switching the load is greatly reduced over what it would be without such change in generator excitation, means for switching the load on or off the generator, and means whereby said aforementioned means may be operated substantially simultaneously in order that opposing tendencies to change in generator voltage may be created to substantially neutralize one another.

6. In a combination including a generator, a load of a character capable of substantially affecting the generator voltage when said load is connected to or disconnected from said generator, a switch for applying said load to and removing it from said generator, time controlled mechanism for closing and opening said switch, means for exciting the generator, the improvement for bettering the voltage regulation of said generator in switching said load on or off the generator, which comprises means for changing said generator excitation in a manner sufficient to effect a tendency to change in generator voltage which is capable of substantially reducing the change in generator voltage due to said load switching, said change in generator excitation being not substantially more than sufficient for such purpose, said means for changing generator excitation including a second switch controlling operation of said change in excitation, and a connection between said second switch and said time controlled mechanism whereby said time controlled mechanism is adapted to operate said second switch only a short time before and substantially simultaneously with the first-mentioned or load switch whereby the change in generator voltage due to said change in generator excitation is slight and yet the tendency to generator voltage change due to the change in generator excitation is substantially opposite to tendency to a change in generator voltage due to load switching and the generator voltage change due to either tendency is but a minor part of what the change in generator voltage due to load switching would be without said change in excitation.

7. In a combination including a generator, a load, a switch for connecting and disconnecting the load and generator, said generator having a field winding, a resistance through which at least some of the current for said field winding passes, a second switch for cutting said resistance in or out of the field circuit, a time controlled mechanism for actuating said load switch, the improvement for enhancing voltage regulation of the generator due to switching the load on or off the generator which includes said resistance being of a size and location such that when short-circuited by said second switch there is a tendency to an increase in the generator voltage which is sufficient but not substantially more than sufficient to oppose the tendency to a reduction in generator voltage due to connecting the load to the generator, a connection between said second switch and the time controlled mechanism whereby said second switch is closed and the resistance short-circuited substantially simultaneously and only a minor fraction of a second before the load switch is closed and a short enough time for the increase in generator voltage due to the increase in generator excitation to be only slight but yet sufficient for the tendency to generator voltage increase due to increase in generator excitation to largely oppose the tendency to generator voltage decrease due to connecting the load with the generator, said time controlled mechanism opening the second switch substantially simultaneously and before the first switch is opened to disconnect the load from the generator.

HOWARD E. SOMES.